(12) United States Patent
Ranjekar

(10) Patent No.: US 8,655,702 B2
(45) Date of Patent: Feb. 18, 2014

(54) SYSTEM AND METHOD FOR OPTIMIZING END-TO-END RESPONSE TIMES DISTRIBUTION ACROSS COMPONENTS IN A PERFORMANCE ENGINEERING PROCESS

(75) Inventor: Abhijit S. Ranjekar, Pune (IN)

(73) Assignee: Infosys Limited, Bangalore (IN)

( * ) Notice: Subject to any disclaimer, the term of this patent is extended or adjusted under 35 U.S.C. 154(b) by 228 days.

(21) Appl. No.: 13/215,173

(22) Filed: Aug. 22, 2011

(65) Prior Publication Data

US 2013/0006699 A1  Jan. 3, 2013

(30) Foreign Application Priority Data

Jun. 30, 2011 (IN) ............................ 2219/CHE/2011

(51) Int. Cl.
*G06Q 10/00* (2012.01)
(52) U.S. Cl.
USPC ....... 705/7.22; 705/7.23; 705/7.25; 705/7.26; 705/7.27

(58) Field of Classification Search
USPC ................................................. 705/7.11–7.42
See application file for complete search history.

(56) References Cited

U.S. PATENT DOCUMENTS 7,117,184 B1 * 10/2006 Fontana et al. .................... 706/1
2008/0071906 A1 * 3/2008 Thoennes et al. ............. 709/224

* cited by examiner

*Primary Examiner* — David Rines
(74) *Attorney, Agent, or Firm* — Marc S. Kaufman; Stephen M. Hertzler; Reed Smith LLP

(57) ABSTRACT

The disclosed embodiment relates to a method for optimizing end-to-end response times distribution across a plurality of components in a performance engineering process. The method preferably comprises determining first, second, and third end-to-end response times for a plurality of components in the process, and determining an optimal end-to-end response time for the components in the process, wherein the optimal end-to-end response time distribution is based on an average of the first end-to-end response time, the second end-to-end response time, and the third end-to-end response time for each component. The disclosed embodiment also relates to a system and computer-readable code that can be used to implement the exemplary methods.

18 Claims, 12 Drawing Sheets

| Sub-step | Calls per unit process | Weight or proportion processing on method call anticipated |
|---|---|---|
| ST1 | 2 | 1 |
| ST2 | 3 | 2 |
| ST3 | 4 | 3 |

| Sub-step | Calls per unit process | Weight or proportion processing on method call anticipated |
|----------|------------------------|------------------------------------------------------------|
| ST1 | 2 | 1 |
| ST2 | 3 | 2 |
| ST3 | 4 | 3 |

| Process flow | Code | e2e Response time average | 90th Percentile |
|---|---|---|---|
| Issue Check Book | BP1 | 8.33 | 9 |
| Inquire Check Status | BP4 | 10.00 | 12 |
| Foreign Travel Notification | BP7 | 10.00 | 12 |
| Validate account closure | BP8 | 10.00 | 12 |

SYSTEM AND METHOD FOR OPTIMIZING END-TO-END RESPONSE TIMES DISTRIBUTION ACROSS COMPONENTS IN A PERFORMANCE ENGINEERING PROCESS

RELATED APPLICATION DATA

This application claims priority to Indian Patent Application No. 2219/CHE/2011, filed Jun. 30, 2011, which is hereby incorporated by reference in its entirety.

FIELD OF THE INVENTION

The invention relates to a system and method for optimizing distribution of end-to-end response times across a plurality of components in a performance engineering process.

BACKGROUND

To keep in tune with business requirements and/or end user or consumer demands, organizations need to cater for increased number of changes-deployments in their software-application. This is made further challenging by having reduced timelines to deployments in order to tap the necessary demand-trend. In such scenarios, the prime challenge being faced by IT departments of organizations is on the front of assuring-ensuring performance. IT managers are invariably seeking for solutions to meet the final goal of "end-to-end performance post production deployment." These situations are being faced even though there is assurance on use of "best coding practices" and execution of "performance testing" because there are performance issues in production (which should not have been there probably due the assurance and testing.) There is strong need to get visibility into "how" the end to end response times will be achieved and examining performance "earlier" in the lifecycle so that (a) performance can be evaluated throughout a software development life cycle (SDLC) (b) corrective measures can be adopted early on (c) there is better utilization of timeframes "before" integrated testing to measure and rectify potential performance degradation.

Early Performance Evaluation Framework

FIG. 1 illustrates, and briefly elaborates on, a V-model used typically for software development life cycle, which is an internationally recognized standard consistent with IEEE definitions. It briefs the milestone activities within the life-cycle and associated testing.

In existing systems, "performance testing" typically happens right at the apex of the right hand side of the V-model, and, in many cases, delays in "earlier" phases further shrinking the timelines for this "last" activity. The conventional mode of "way things work in practice" has major disadvantages. For example, there is no (or negligible) visibility of performance aspects right until the end-to-end system is integrated. Thus, there is a need to rely upon assumptions that the code will be performing individually as well as while interfacing across necessary components. In addition, there is a small window to take action upon in case any corrective measures need to be taken, which leads to a lack of time to properly evaluate any option and necessitates the need for quick fix solutions and inability to have any significant changes in code/design/deployment.

In addition, current practices for budgeting response times are purely based on thumb rules, historical values and experience of designers. There is no scientific basis on which response time break-ups can be arrived at. Thus, there are two major limitations in the current technology. First, it is very difficult to determine efficient response time distributions, and second, there is no scientific basis for establishing efficient response time distributions.

SUMMARY

The disclosed embodiment relates to a method for optimizing end-to-end response times distribution across a plurality of components in a performance engineering process. This enables evaluation of performance throughout stages of a software development life cycle and facilitates corrective measures at various stages assuring compliance of the integrated systems towards the target response time. The method preferably comprises determining a first end-to-end response time for a plurality of components in the process, wherein the first end-to-end response time assumes that an equal amount of time is spent on each of a plurality of method calls occurring during the process, determining a second end-to-end response time for the components in the process, wherein each of the plurality of method calls are assigned a weight based on the importance of the method call to the process, and wherein the second end-to-end response time assumes that the amount of time spent on each method calls is proportional to the total number of method calls and the weight assigned to each method call, determining a third end-to-end response time for the components in the process, wherein the third end-to-end response time assumes that the amount of time spent on each method calls is inversely proportional to the total number of method calls and proportional to the weight assigned to each method call, and determining an optimal end-to-end response time for the components in the process, wherein the optimal end-to-end response time is based on an average of the first end-to-end response time, the second end-to-end response time, and the third end-to-end response time for each component.

The disclosed embodiment further relates to a system for optimizing end-to-end response times distribution across a plurality of components in a performance engineering process. The system preferably comprises a computing device configured to determine a first end-to-end response time for a plurality of components in the process, wherein the first end-to-end response time assumes that an equal amount of time is spent on each of a plurality of method calls occurring during the process, a computing device configured to determine a second end-to-end response time for the components in the process, wherein each of the plurality of method calls are assigned a weight based on the importance of the method call to the process, and wherein the second end-to-end response time assumes that the amount of time spent on each method calls is proportional to the total number of method calls and the weight assigned to each method call, a computing device configured to determine a third end-to-end response time for the components in the process, wherein the third end-to-end response time assumes that the amount of time spent on each method calls is inversely proportional to the total number of method calls and proportional to the weight assigned to each method call, and a computing device configured to determine an optimal end-to-end response time for the components in the process, wherein the optimal end-to-end response time is based on an average of the first end-to-end response time, the second end-to-end response time, and the third end-to-end response time for each component.

The disclosed embodiment also relates to computer-readable code stored on a non-transitory computer-readable medium that, when executed by a mobile device, performs a method for optimizing end-to-end response times distribution across a plurality of components in a performance engineering process. The method preferably comprises determining a first end-to-end response time for a plurality of components in the process, wherein the first end-to-end response time assumes that an equal amount of time is spent on each of a plurality of method calls occurring during the process, determining a second end-to-end response time for the components in the process, wherein each of the plurality of method calls are assigned a weight based on the importance of the method call to the process, and wherein the second end-to-end response time assumes that the amount of time spent on each method calls is proportional to the total number of method calls and the weight assigned to each method call, determining a third end-to-end response time for the components in the process, wherein the third end-to-end response time assumes that the amount of time spent on each method calls is inversely proportional to the total number of method calls and proportional to the weight assigned to each method call, and determining an optimal end-to-end response time for the components in the process, wherein the optimal end-to-end response time is based on an average of the first end-to-end response time, the second end-to-end response time, and the third end-to-end response time for each component.

The disclosed embodiment further provides that the process may comprise a plurality of sub-processes, and that the number of method calls occurring during a sub-process may be based on the number of activities with the sub-process. In addition, the disclosed embodiment provides that the weight assigned to each method call may be based on a description of the method call. Furthermore, the disclosed embodiment provides that the optimal end-to-end response time distribution may be compared to an actual end-to-end response time distribution, and that a determination may be made regarding whether an adjustment can be made to the process to improve the actual end-to-end response time distribution.

DETAILED DESCRIPTION

Figure 1:
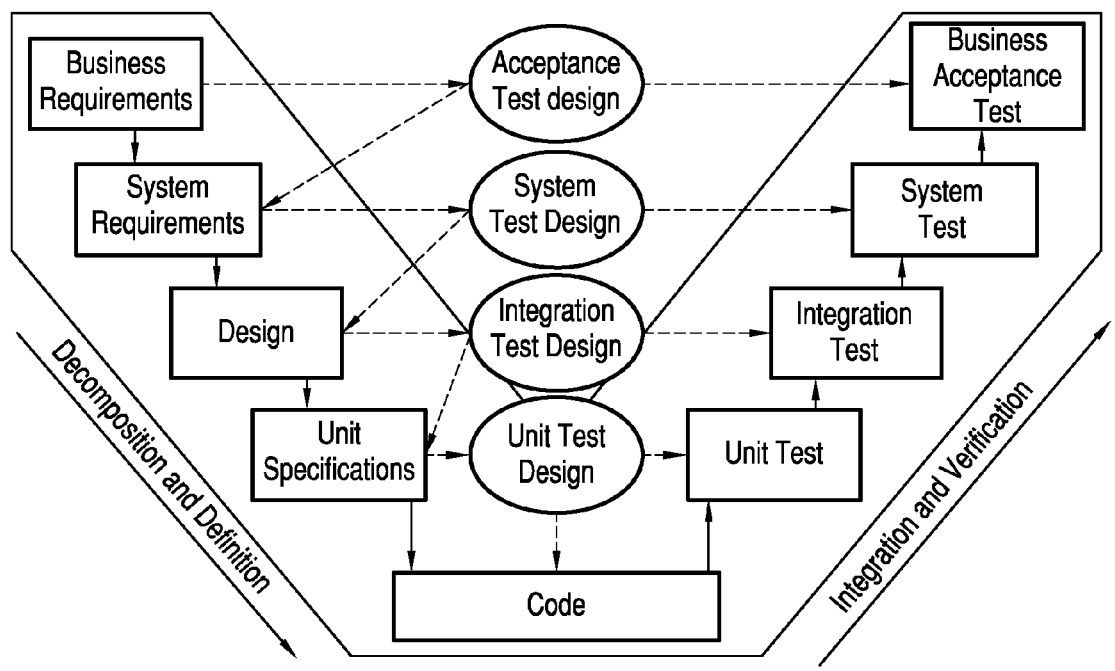
FIG. 1 illustrates a V-model used typically for software development life cycle

The disclosed embodiments relate to methods for evaluating performance throughout various stages during software development life cycle. There is a need to engage early in the process, right from the beginning to assess performance aspects rather than waiting until the 'end' to judge the performance of the end-to-end system. The techniques enable better grip over performance assessment and provide 'ample' timelines to 'correct' performance-requirements. The methods of the disclosed embodiments are especially useful for large scale integration, migration, transformation programs which involve multiple components and typically run over long durations.

Thus, the disclosed embodiments present solutions for organizations/practitioners seeking ways and means to evaluate performance throughout the program/project lifecycle. It reduces dependency on the last stage performance testing as the only place to judge performance and suggest recommendations for improvements. Since this phase occurs right at the end of the cycle, all delays in earlier phases anyway reduce the timelines available for thorough examination, under these circumstances it is very irrational to expect recommendations to come out of the exercise and there is almost no time available to try out and/or implement them and judge their effect. These are the typical circumstances howsoever planned the program/project lifecycle be and the convenient way out is typically go ahead with the deployment and blame the performance testing activity for lack of effectiveness when issues are discovered post deployment. The methods of the disclosed embodiment address the known shortcomings and provide a holistic approach to implement, integrate within the lifecycle.

For example, the process facilitates (a) evaluating and understanding the performance throughout the cycle, (b) sufficient time for rectification, (c) improvement when the stage is relevant and the work is underway (then and there itself), (d) time to judge the possibility of "absorbing shock" within the end-to-end, (e) better confidence level as programs near deployment, and finally (f) assured performance and/or right expectations and visibility to business as against surprises at late stages.

The framework-methodology of the disclosed embodiment can be utilized across multiple platforms—architectures—applications. Moreover the flexibility in terms of "measure of the yardstick" and the granularity of the components allow the tailoring-customization to suit the need of the given organization-program to extract maximum benefits. One can use a variety of stages to suit the case under consideration—some already suggested in the framework. Further, decision making can be subject to goals and targets as applicable across stages and with involvement of relevant stakeholders at various stages.

More specifically, the disclosed embodiments relate to the optimization of response time budgeting across components. The budgeting can be done at whatever granularity required and to any extent of abstraction when it comes to breaking down into-across components. The segregation is based on mathematical techniques which split the end-to-end response time subject the parameters associated with the 'steps' of the flow. One typical complaint about non-functional requirements (NFRs) of a process is that they are not 'detailed enough'. One of the key factors within the non-functional requirements being the response times—in almost all the cases non-functional requirements specify end-to-end response times or the SLAs in terms of averages and/or 90th percentiles for the complete transaction. The end-to-end system comprises of multiple components, sub-systems, external systems and possible significant network components.

The failure of traditional systems to have response times budgeting across components leads to designing applications without clear performance targets and the comparison of the 'actual' end-to-end response time against the desired SLAs/requirements is discovered right at the end when performance testing is conducted on the completely integrated system. This has some major drawbacks including, for example, a lack of visibility of performance during early phased of software development life cycle, and significantly less time for corrections-modifications at the end of life cycle.

The disclosed embodiment addresses the shortcomings described above by early engagement-visibility into performance which in turn allows better anticipation and control over one of the key aspects of performance—response times. The disclosed embodiment further relates to cascading the response times at necessary granularity across components leading to performance targets for components which can be assessed throughout the design to integration testing phases of software development life cycle.

The methods of the disclosed embodiments are applicable in all types of projects involving software developments, including applications, products, migrations, transformations, programs, and the like. Preferably, the methods disclosed herein are employed right from planning-requirements phase of a software development life cycle to realize its full potential-benefits. The methods of the disclosed embodiments are also particularly useful when development is being handled by third party vendors since the performance responsibility can be quantified and assured before the individual components are assembled to get the first view on end-to-end performance.

The problem of breaking down the response times—non-functional requirements into granular details has been pervasive for long time. The problem has been addressed through novel methodologies employed in the disclosed embodiments.

Figure 2:
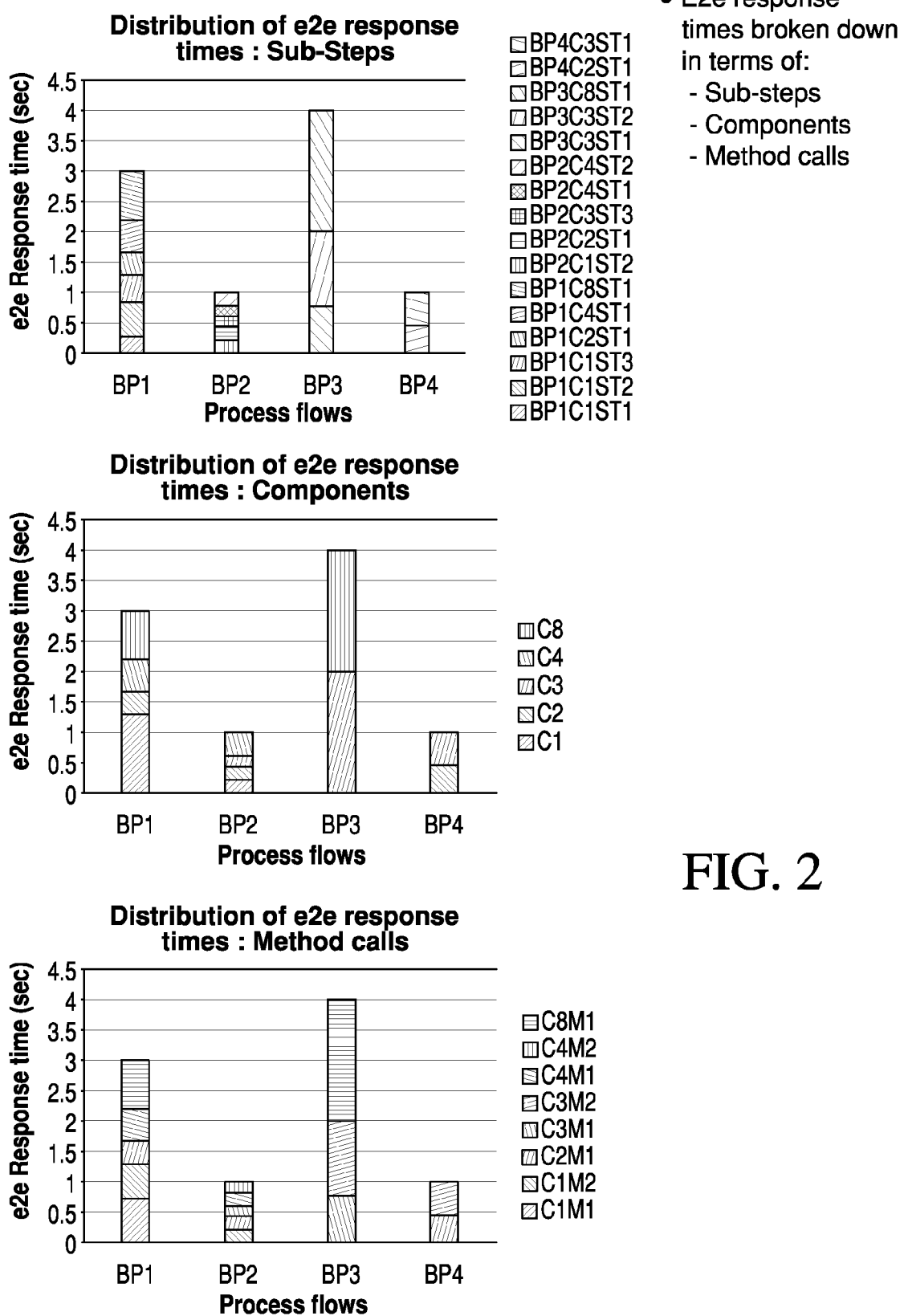
FIG. 2 illustrates exemplary optimal distribution of end-to-end response time data based on the disclosed embodiment.
Figure 3:
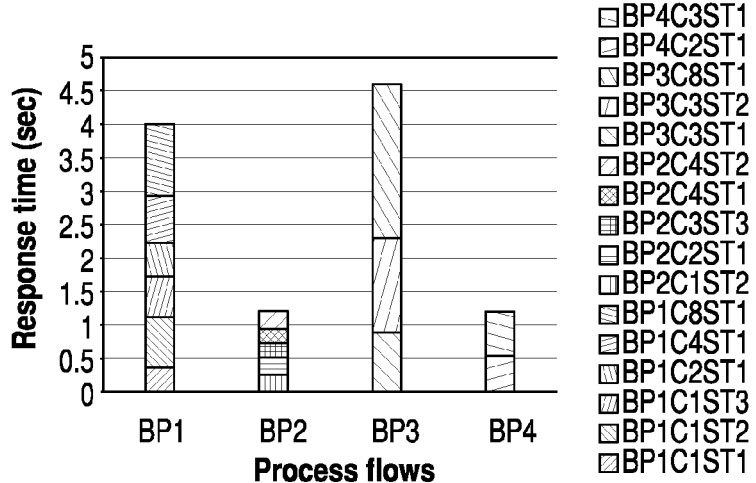
FIG. 3 illustrates exemplary optimal distribution of end-to-end response time (ninetieth percentiles) data based on the disclosed embodiment.
Figure 3:
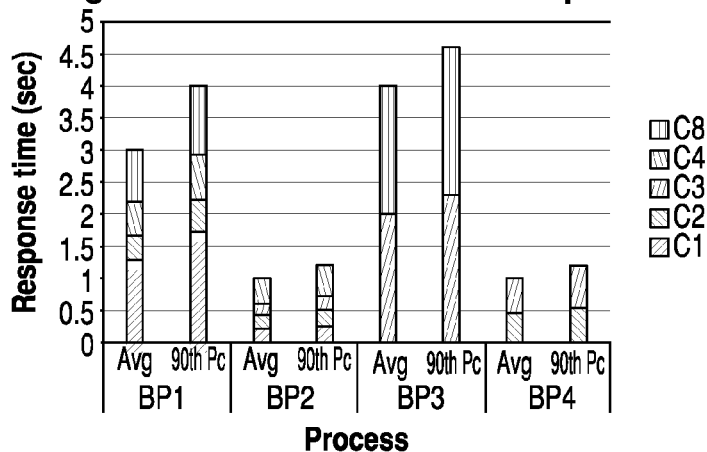
Figure 3:
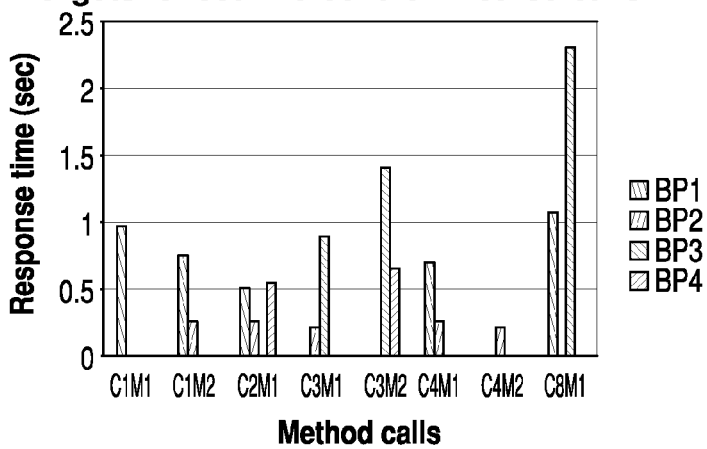

The charts shown in FIGS. 2 and 3 pictorially describe the outcome of the disclosed embodiments being discussed. Depending on the granularity required/configured, the result is the breakdown of the end-to-end response times and $90^{th}$ percentiles into the required 'blocks'. This in turn leads to appropriate performance targets for the sub-systems—this helps designers-architects-vendors and application owners at various stages to accomplish the overall performance goals.

According to the disclosed embodiments, end-to-end response time broken down into necessary 'components' and granularity based on the following scenarios. In a first scenario, it is assumed that there is equal time for all the calls being made. In a second scenario, it is assumed that the time per call is proportional to the respective weights of each call and the total number of calls being made. In a third scenario, it is assumed that the time per call is proportional to respective weights of each call and inversely proportional to the total number of calls being made. In this regard, as volume of the given flow increases there will be multitude of calls since for each individual transaction there will be numerous calls for the given sub-step thus the need to press down upon call time budget to allow better performance and hence the inverse proportion being introduced. As explained herein, the optimized end-to-end response time budget is the value averaged across out across these three scenarios. Thus, the disclosed embodiments allow for 'fluctuations' in accordance with the scenarios described above and gives a scientific base for arriving at the break-up.

According to a disclosed embodiment, for a business process/flow/transaction, the response time budget for a sub-step is obtained using the number of calls within that sub-step and the weight of the step using the formula as below. Note that the sum in denominator is to be taken over all the sub-steps of that flow ($\Sigma_{Steps}$)

$$\text{Step response time budget} = \frac{e2e \text{ Response time}}{3} * \left[ \frac{\text{Step calls count}}{\sum_{Steps} \text{Step call count}} + \frac{\text{Step calls count} * \text{Step weight}}{\sum_{Steps} \text{Step calls count} * \text{Step weight}} + \frac{\text{Step weight}/\text{Step calls count}}{\sum_{Steps} \text{Step weight}/\text{Step calls count}} \right]$$

More specifically, the disclosed embodiments preferably relate to a method for optimizing end-to-end response times across a plurality of components in a performance engineering process. The method preferably comprises determining a first end-to-end response time for a plurality of components in the process, wherein the first end-to-end response time assumes that an equal amount of time is spent on each of a plurality of method calls occurring during the process, determining a second end-to-end response time for the components in the process, wherein each of the plurality of method calls are assigned a weight based on the importance of the method call to the process, and wherein the second end-to-end response time assumes that the amount of time spent on each method calls is proportional to the total number of method calls and the weight assigned to each method call, determining a third end-to-end response time for the components in the process, wherein the third end-to-end response time assumes that the amount of time spent on each method calls is inversely proportional to the total number of method calls and proportional to the weight assigned to each method call, and determining an optimal end-to-end response time for the components in the process, wherein the optimal end-to-end response time is based on an average of the first end-to-end response time, the second end-to-end response time, and the third end-to-end response time for each component.

Figure 4:
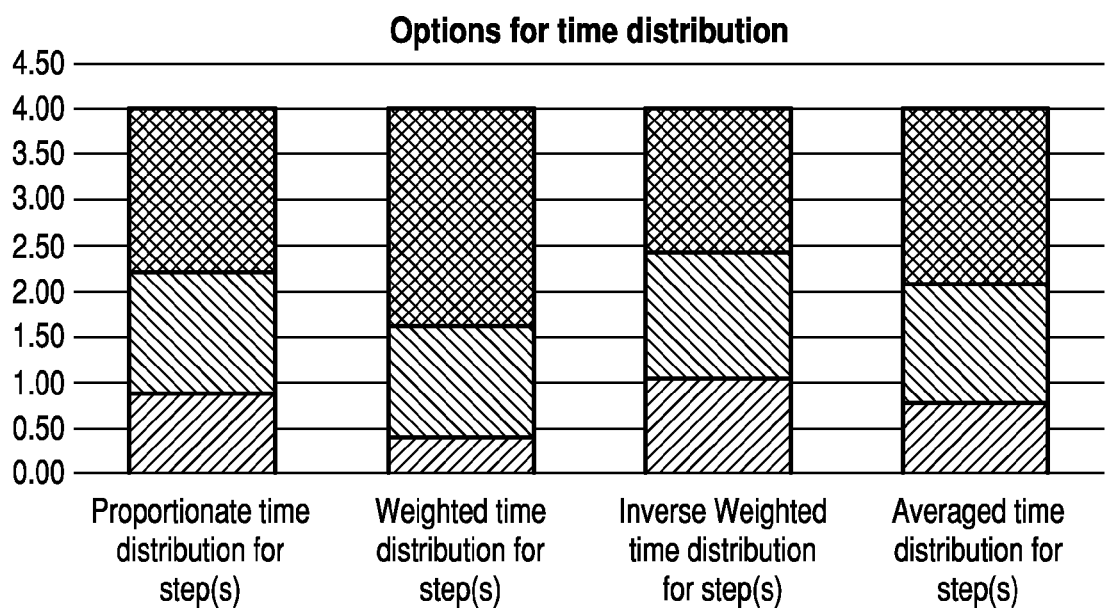
FIG. 4 illustrates an exemplary three step process according to the disclosed embodiment.

The disclosed embodiment further provides that the process may comprise a plurality of sub-processes, and that the number of method calls occurring during a sub-process may be based on the number of activities with the sub-process. In addition, the disclosed embodiment provides that the weight assigned to each method call may be based on a description of the method call. The description may include a description of the activities within the sub-step and/or the intensity or importance of the activities. Furthermore, the disclosed embodiment provides that the optimal end-to-end response time may be compared to an actual end-to-end response time, and that a determination may be made regarding whether an adjustment can be made to the process to improve the actual end-to-end response time. For example, assume a simple three step process with the parameters as shown in FIG. 4, with the chart elaborating the time budgeting using the criterions above and the averaged budget.

As set forth herein, the disclosed embodiments address a long standing and faced everywhere issue of detailing the non-functional requirements in terms of response time breakups. In addition, the disclosed embodiments provide a scientific methodology to arrive at response time budgeting, and facilitate early performance evaluation-validation throughout the stages of software development life cycle.

Figure 5:
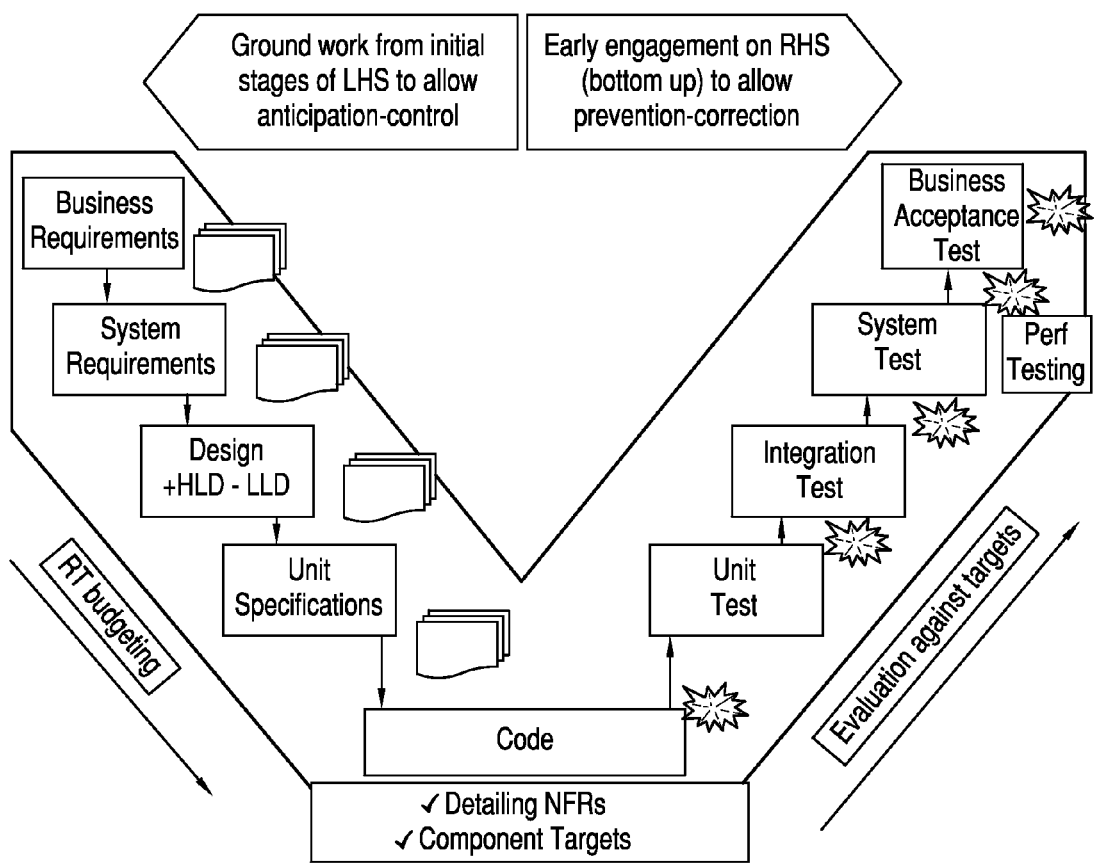
FIG. 5 illustrates the various stages within software development life cycle along with enhancements being brought in owing to the disclosed embodiment.
Figure 6:
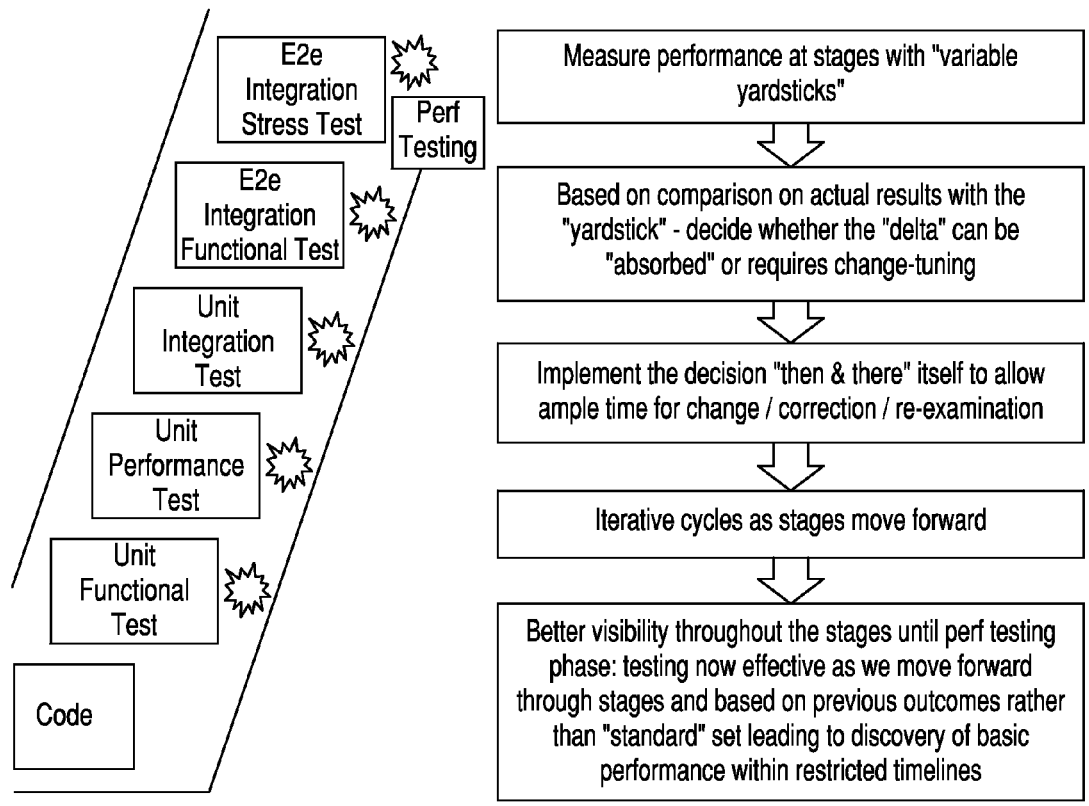
FIG. 6 illustrates how a framework is used for performance examination at milestone stages on the right hand side of software development life cycle throughout "bottom-up".
Figure 7:
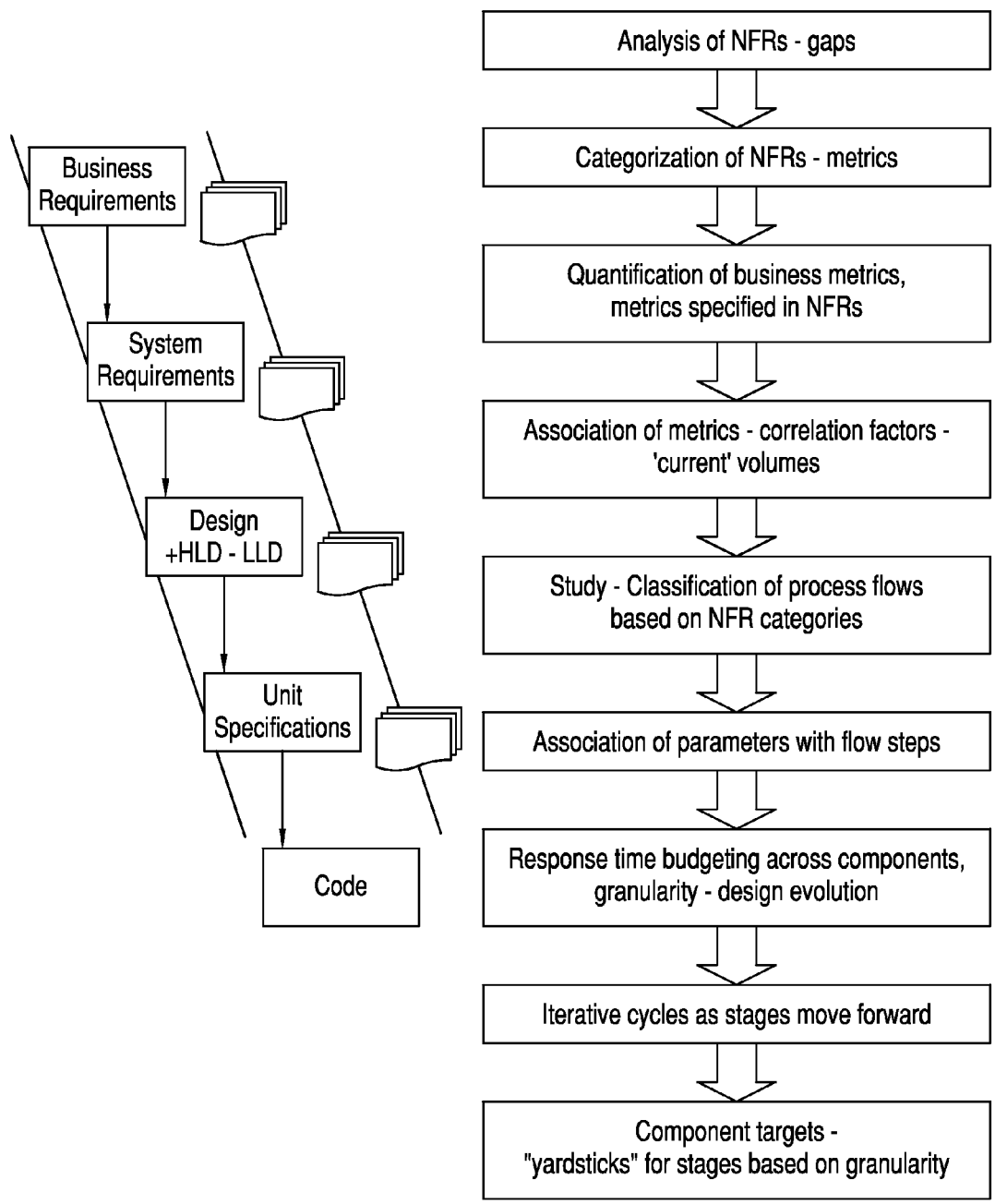
FIG. 7 illustrates the use of examinations enabled on the right hand side (RHS) by arriving at "yardsticks"—component targets by analyzing and working upon requirements to design—throughout top down on left hand side (LHS), according to the disclosed embodiment.

As noted above, there are many advantages to arriving at "Early Performance Evaluation" at various stages within software development life cycle. With reference to FIG. 5, these include, for example, facilitating effective performance assessment in 'available windows' (at various stages), implanting performance evaluations 'below the apex' on the right hand side of 'V,' equipping stakeholders at various stages to know "how much good is good enough," enabling implanted evaluation through apt practices on the left hand side of 'V,' and the like. FIGS. 5, 6, and 7 elaborate pictorially the framework-methodology to bring about 'early visibility' on performance instead of "waiting" to uncover issues right till the 'end' of 'V'.

The basic building block of the framework relates to arriving at the "component level" targets (or yard-sticks) against which the measurement of the performance can be compared. Once the yard-sticks in terms of "granularity" required at the associated stage are determined, then the mechanism can be put into in place to measure the performance of the given "component" at the given stage. As an illustration, at the coding phase, if the targets in terms of response time of a method call are known, it is much easier to assess the actual performance of the code. The benefit of this approach include, for example, providing developers-designers with a way to compare against 'some benchmark number,' and, in case the measurement is substantially "off the mark," the opportunity to try out alterations to tune/change code/settings to achieve the "granular" target. The "granularity" of "components" can be in terms of application components of the system, network-server components, methods within an application, calls across applications or interfaces, etc.

FIG. 6 illustrates the way this framework works to facilitate performance examination at milestone stages on the right hand side of software development life cycle throughout "bottom-up". In this regard, and referring to FIG. 7, the examinations are enabled on the right hand side (RHS) by arriving at "yardsticks"—component targets by analyzing and working upon requirements to design—throughout top down on left hand side (LHS). This involves thorough examination of non-functional requirements to quantify and the bridge the gaps, extract the workload metrics as specified-indicated within non-functional requirements and correlate them with "current" and/or "projected" volumes to arrive at the component load. Alongside, associate the process flows with the non-functional requirement metrics to compute flow volumes. Further examination of flow steps (L2-L3) and associated volumes lead to the component targets. The granularity-targets can be refined as the design-architecture evolves to finer levels right down to method calls. Thus, as the left hand side is worked through the stages, the component level targets can be determined as the Coding phase from which the evaluation can begin is reached.

The following example expands the methodology on a transformation program which is about upgrading the existing-legacy systems onto enterprise applications. Given the typical nature of such programs wherein the systems in their current form are "working" and the only visibility is the end-to-end performance, it is very challenging to anticipate and have control over the performance of the "new" system. The principles as defined herein were employed to get better visibility and grip over ensuring the performance of the "new" system under evolution.

Component Targets

Figure 8:
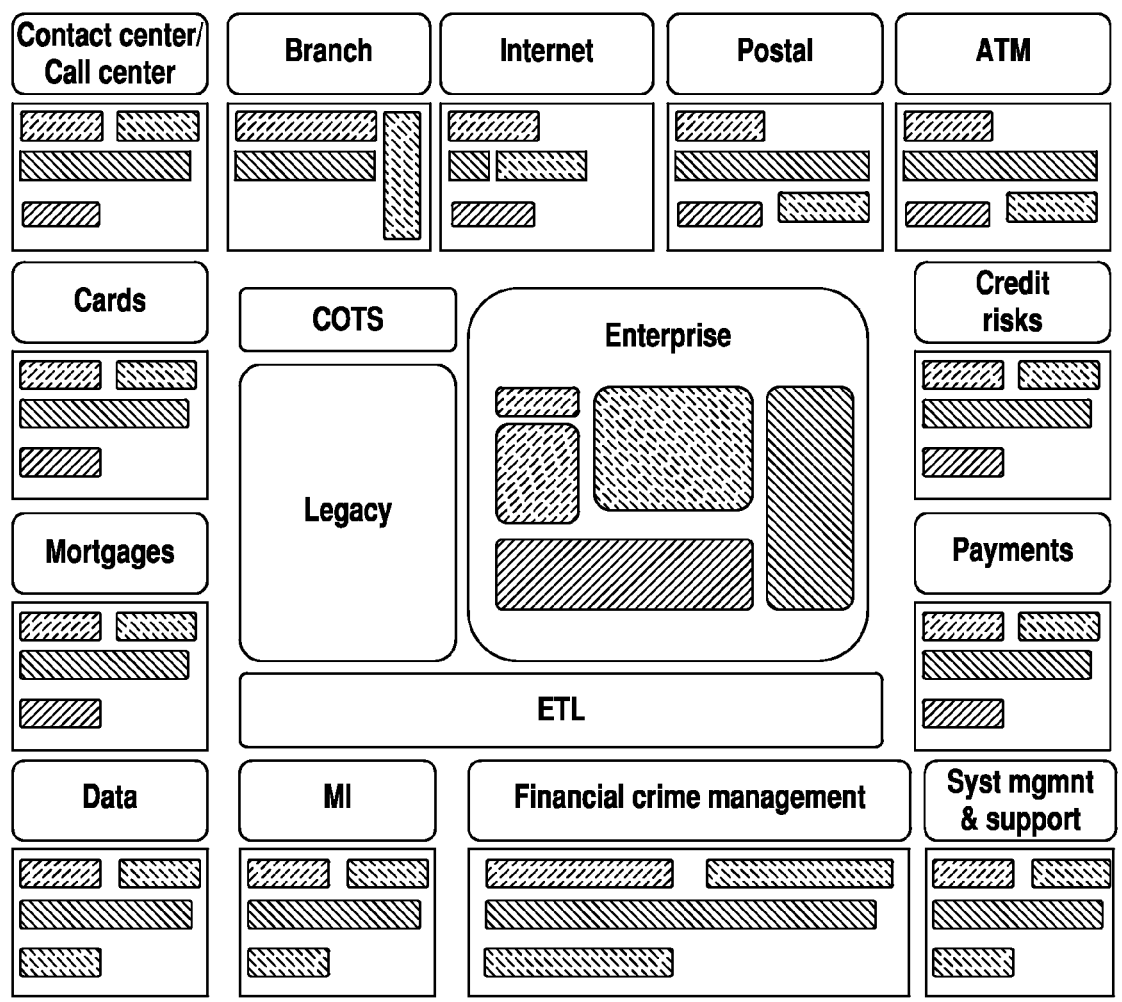
FIG. 8 illustrates the kind of architecture involved and the multiple components within an exemplary system.

The existing "legacy" system had multiple components and transformation program running over long period replacing-retiring these components suitably. The transient phases involve presence of multitude of "existing" systems and phase wise introduction of "new" systems. The "new" systems-components are built in parallel and mutually independent and most importantly often by different vendors. FIG. 8 illustrates the kind of architecture involved and the multiple components within the system.

Figure 9:
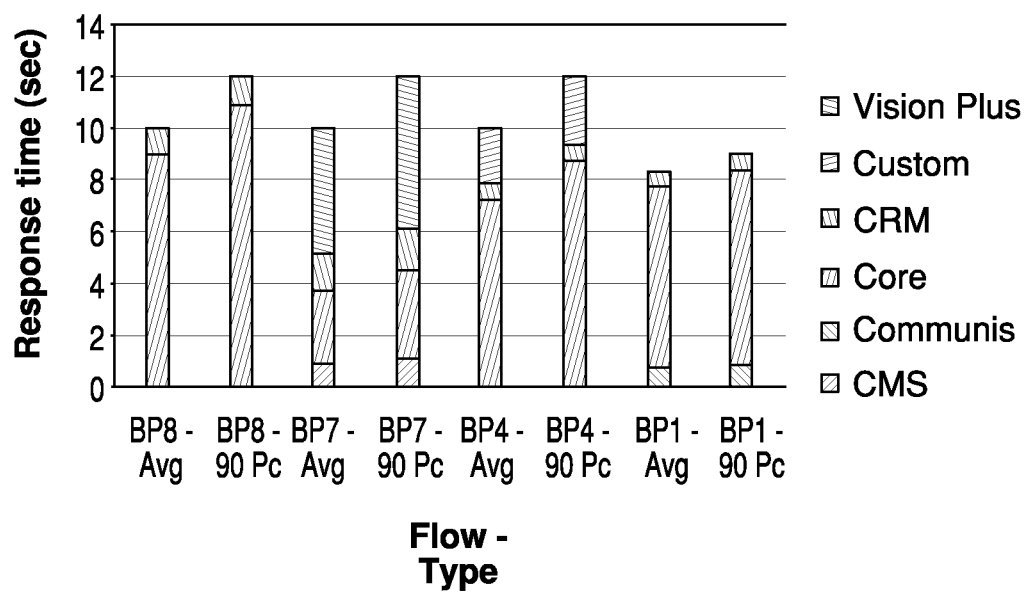
FIG. 9 illustrates exemplary component wise response time distributions for some of the flows in accordance with disclosed embodiment.
Figure 10:
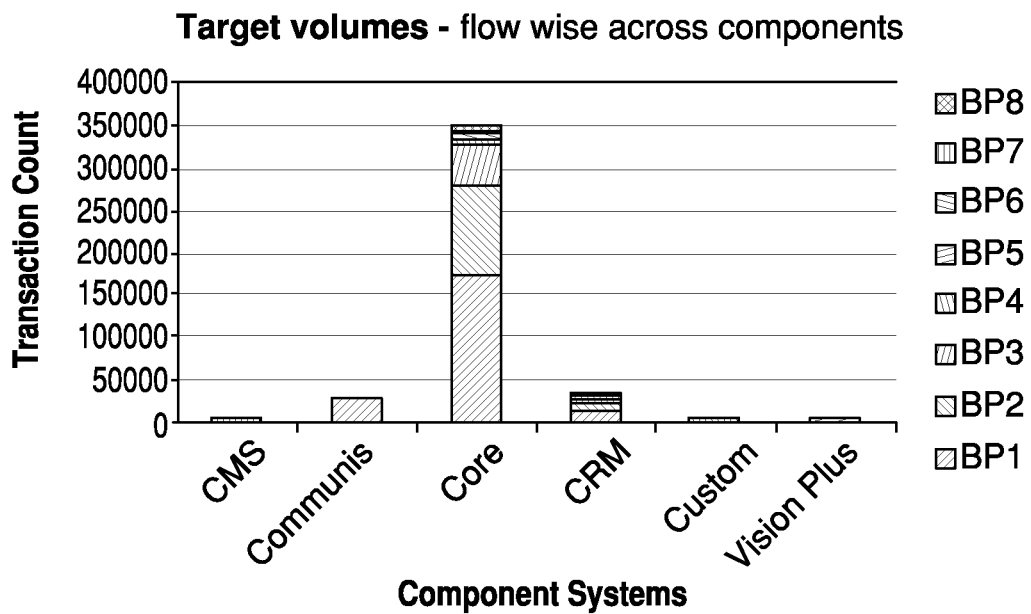
FIG. 10 illustrates exemplary component wise targets in terms of volumes and compositions.
Figure 10:
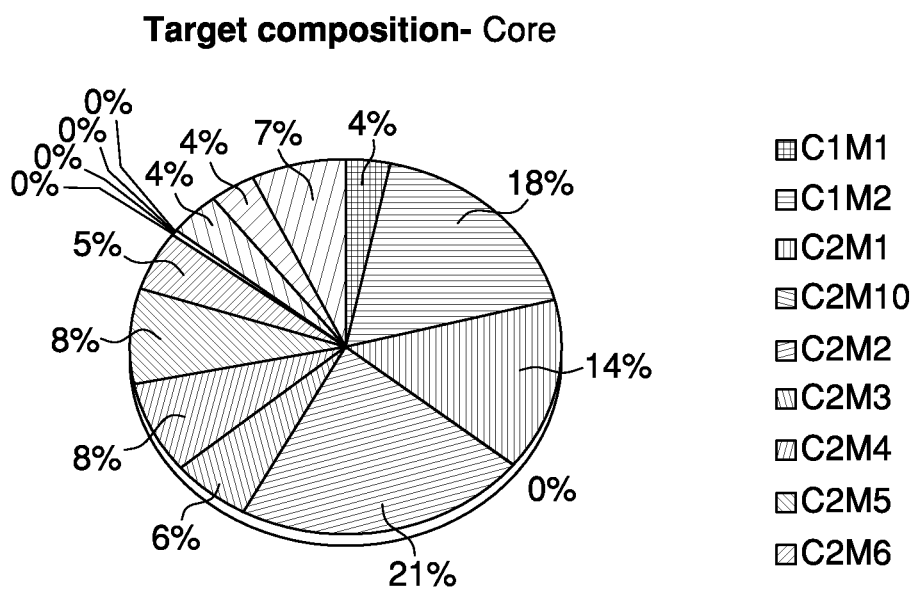

Clearly the complexity itself introduces significant "lack of visibility" and risk associated with the performance of the platform. While the end-to-end targets are known-set by business, it's a big "unknown" as to whether they would be achieved and how. The surprises have to wait until the end-to-end integration discovers performance issues. Thus making this a fit case to enable performance evaluation throughout software development life cycle and across components. FIG. 9 illustrates the component wise targets for some of the flows as a first step in the methodology. FIG. 10 illustrates the component wise targets in terms of volumes and compositions.

Evaluation Strategy

The next step is to examine the component wise performance "independently" and over time period. The following milestones can be used to assess the performance on the right hand side bottom-up: Component development (coding phase), Component development complete, (Two or more) Components along with Interface (as both components and interfaces are ready), End-to-end components integrated together (multiple components with multiple interfaces), and the like.

Figure 11:
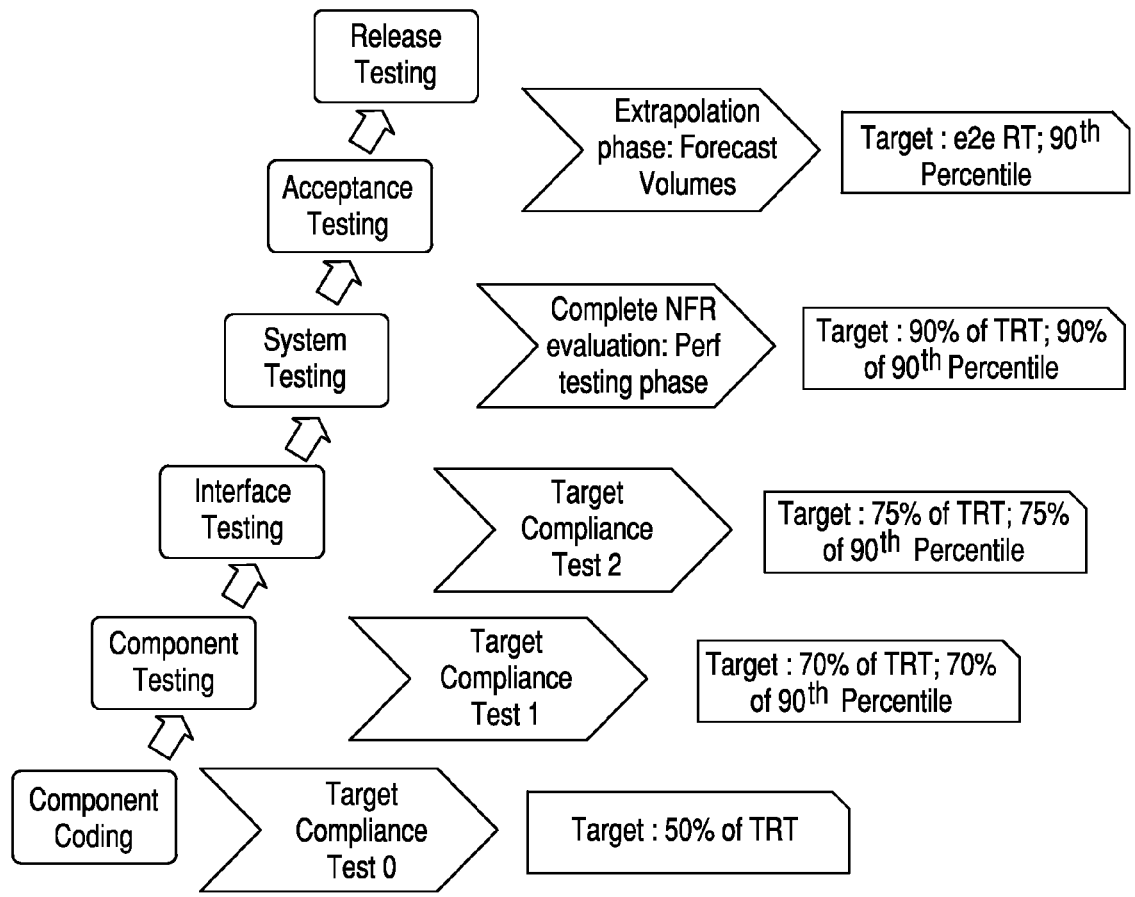
FIG. 11 illustrates the strategic performance evaluation lifecycle along with the targets at various stages.

FIG. 11 illustrates the strategic performance evaluation lifecycle along with the targets at various stages. TRT corresponds to target response time. As a first step, the end-to-end response time is broken down to individual "component" level target response times ("component" could stand for the aggregate sub-system or down to individual method calls within sub-system depending on the granularity to which the break-down has been done). For the "component" level target—the evaluation is done against "reduced" target in the "initial" stages and response time "allowed to occupy" its "full room" only at the "later" stages of testing when tested on end-to-end platform with anticipated business forecast volumes.

Assessment and Correction

The process of implementing the approach and the methodology includes, for example, deriving "component" level targets for response times, volumes, etc., specifying the "yardstick" target for each evaluation stage based on the "component" target, examining the performance through different ways of testing as suitable-appropriate, simplistic testing during coding, conducting load test on milestone component, load plus manual across interfaces-components as suitable to the stage under consideration, tuning the performance and/or re-evaluate, adjust the targets within the end-to-end time, progressing towards mature performance and performance testing at the "end stage," and the like.

Figure 12:
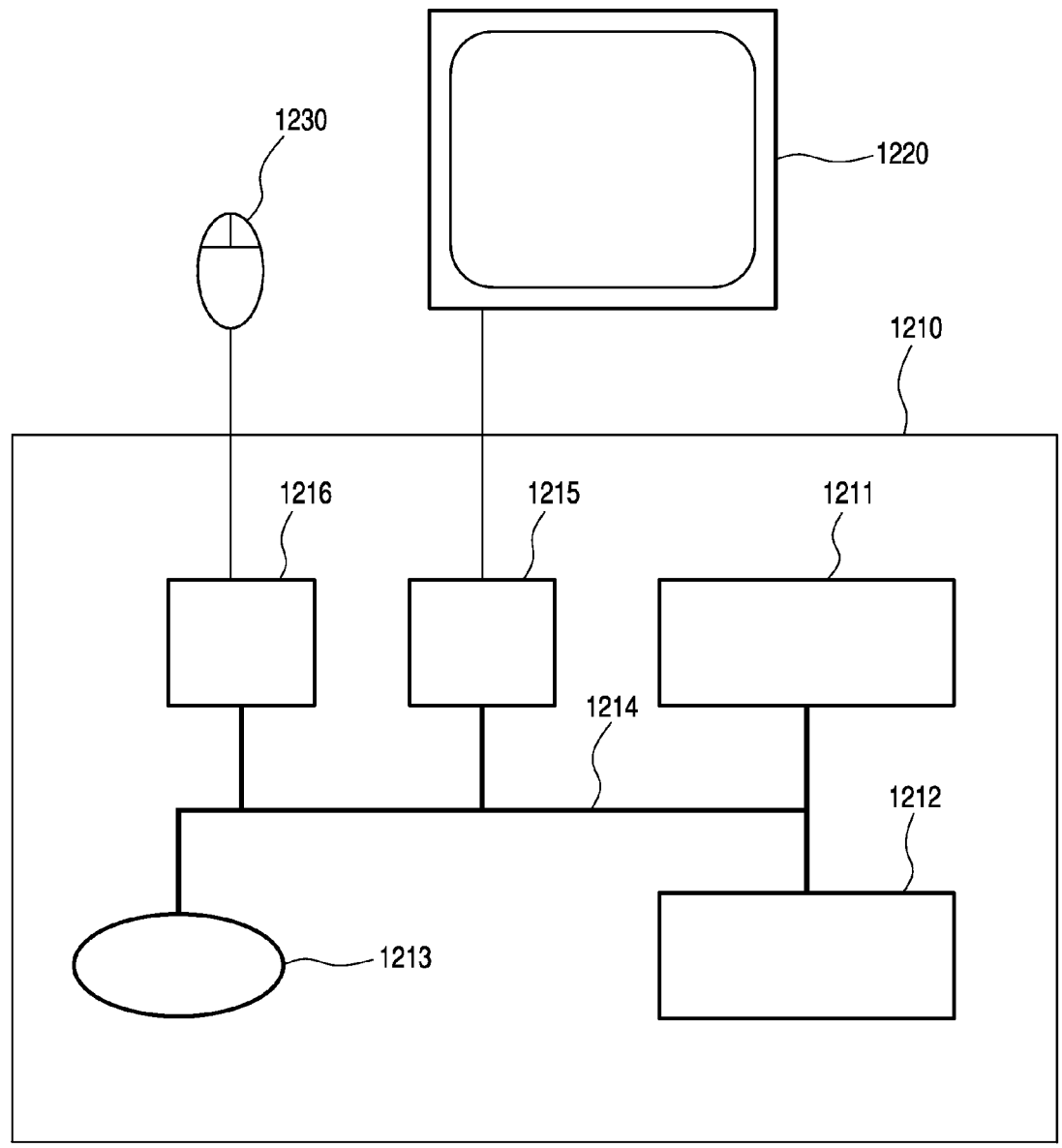
FIG. 12 illustrates an exemplary computing device useful for implementing systems and performing methods disclosed herein.

The embodiments described herein may be implemented with any suitable hardware and/or software configuration, including, for example, modules executed on computing devices such as computing device 1210 of FIG. 12. Embodiments may, for example, execute modules corresponding to steps shown in the methods described herein. Of course, a single step may be performed by more than one module, a single module may perform more than one step, or any other logical division of steps of the methods described herein may be used to implement the processes as software executed on a computing device.

Computing device 1210 has one or more processing device 1211 designed to process instructions, for example computer readable instructions (i.e., code) stored on a storage device 1213. By processing instructions, processing device 1211 may perform the steps set forth in the methods described herein. Storage device 1213 may be any type of storage device (e.g., an optical storage device, a magnetic storage device, a solid state storage device, etc.), for example a non-transitory storage device. Alternatively, instructions may be stored in remote storage devices, for example storage devices accessed over a network or the internet. Computing device 1210 additionally has memory 1212, an input controller 1216, and an output controller 1215. A bus 1214 operatively couples components of computing device 1210, including processor 1211, memory 1212, storage device 1213, input controller 1216, output controller 1215, and any other devices (e.g., network controllers, sound controllers, etc.). Output controller 1215 may be operatively coupled (e.g., via a wired or wireless connection) to a display device 1220 (e.g., a monitor, television, mobile device screen, touch-display, etc.) in such a fashion that output controller 1215 can transform the display on display device 1220 (e.g., in response to modules executed). Input controller 1216 may be operatively coupled (e.g., via a wired or wireless connection) to input device 1230 (e.g., mouse, keyboard, touch-pad, scroll-ball, touch-display, etc.) in such a fashion that input can be received from a user (e.g., a user may input with an input device 1230 a dig ticket).

Of course, FIG. 12 illustrates computing device 1210, display device 1220, and input device 1230 as separate devices for ease of identification only. Computing device 1210, display device 1220, and input device 1230 may be separate devices (e.g., a personal computer connected by wires to a monitor and mouse), may be integrated in a single device (e.g., a mobile device with a touch-display, such as a Smartphone or a tablet), or any combination of devices (e.g., a computing device operatively coupled to a touch-screen display device, a plurality of computing devices attached to a single display device and input device, etc.). Computing device 1210 may be one or more servers, for example a farm of networked servers, a clustered server environment, or a cloud network of computing devices.

While systems and methods are described herein by way of example and embodiments, those skilled in the art recognize that the systems and methods for improving call center efficiency are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

Various embodiments of the disclosed embodiment have been disclosed herein. However, various modifications can be made without departing from the scope of the embodiments as defined by the appended claims and legal equivalents.

What is claimed is:

1. A method for optimizing end-to-end response times distribution across a plurality of components in a performance engineering process, the method comprising:
   determining, by a computing device, a first end-to-end response time for a plurality of components in the process, wherein the first end-to-end response time is based at least in part on an equal amount of time being spent on each of a plurality of method calls occurring during the process;
   determining, by a computing device, a second end-to-end response time for the components in the process, wherein each of the plurality of method calls are assigned a weight based at least in part on an activity level associated with the method call, and wherein the second end-to-end response time is based at least in part on the amount of time spent on each of the method calls being proportional to the total number of method calls and the weight assigned to each method call;
   determining, by a computing device, a third end-to-end response time for the components in the process, wherein the third end-to-end response time is based at least in part on the amount of time spent on each of the method calls being inversely proportional to the total number of method calls and proportional to the weight assigned to each method call; and
   determining, by a computing device, an optimal end-to-end response time for the components in the process, wherein the optimal end-to-end response time is based on an average of the first end-to-end response time, the second end-to-end response time, and the third end-to-end response time for each component.

2. The method of claim 1, wherein the process comprises a plurality of sub-processes.

3. The method of claim 2, wherein the number of method calls occurring during a sub-process is based on the number of activities with the sub-process.

4. The method of claim 1, wherein the weight assigned to each method call is based on a description of the method call.

5. The method of claim 1, further comprising comparing, by a computing device, the optimal end-to-end response time distribution with an actual end-to-end response time distribution.

6. The method of claim 5, further comprising determining, by a computing device, an adjustment that can be made to the process to improve the actual end-to-end response time distribution.

7. A system for optimizing end-to-end response times distribution across a plurality of components in a performance engineering process, the system comprising:
   a computing device configured to determine a first end-to-end response time for a plurality of components in the process, wherein the first end-to-end response time is based at least in part on an equal amount of time being spent on each of a plurality of method calls occurring during the process;
   a computing device configured to determine a second end-to-end response time for the components in the process, wherein each of the plurality of method calls are assigned a weight based at least in part on an activity level associated with the method call, and wherein the second end-to-end response time is based at least in part on the amount of time spent on each of the method calls being proportional to the total number of method calls and the weight assigned to each method call;
   a computing device configured to determine a third end-to-end response time for the components in the process, wherein the third end-to-end response time is based at least in part on the amount of time spent on each of the method calls being inversely proportional to the total number of method calls and proportional to the weight assigned to each method call; and a computing device configured to determine an optimal end-to-end response time for the components in the process, wherein the optimal end-to-end response time is based on an average of the first end-to-end response time, the second end-to-end response time, and the third end-to-end response time for each component.

8. The system of claim 7, wherein the process comprises a plurality of sub-processes.

9. The system of claim 8, wherein the number of method calls occurring during a sub-process is based on the number of activities with the sub-process.

10. The system of claim 7, wherein the weight assigned to each method call is based on a description of the method call.

11. The system of claim 7, further comprising a computing device configured to compare the optimal end-to-end response time distribution with an actual end-to-end response time distribution.

12. The system of claim 11, further comprising a computing device configured to determine an adjustment that can be made to the process to improve the actual end-to-end response time distribution.

13. Computer-readable code stored on a non-transitory computer-readable medium that, when executed by a mobile device, performs a method for optimizing end-to-end response times distribution across a plurality of components in a performance engineering process, the method comprising:

determining, by a computing device, a first end-to-end response time for a plurality of components in the process, wherein the first end-to-end response time is based at least in part on an equal amount of time being spent on each of a plurality of method calls occurring during the process;

determining, by a computing device, a second end-to-end response time for the components in the process, wherein each of the plurality of method calls are assigned a weight based at least in part on an activity level associated with the method call, and wherein the second end-to-end response time is based at least in part on the amount of time spent on each of the method calls being proportional to the total number of method calls and the weight assigned to each method call;

determining, by a computing device, a third end-to-end response time for the components in the process, wherein the third end-to-end response time is based at least in part on the amount of time spent on each of the method calls being inversely proportional to the total number of method calls and proportional to the weight assigned to each method call; and determining, by a computing device, an optimal end-to-end response time for the components in the process, wherein the optimal end-to-end response time is based on an average of the first end-to-end response time, the second end-to-end response time, and the third end-to-end response time for each component.

14. The computer-readable code of claim 13, wherein the process comprises a plurality of sub-processes.

15. The computer-readable code of claim 14, wherein the number of method calls occurring during a sub-process is based on the number of activities with the sub-process.

16. The computer-readable code of claim 13, wherein the weight assigned to each method call is based on a description of the method call.

17. The computer-readable code of claim 13, wherein the method further comprises comparing, by a computing device, the optimal end-to-end response time distribution with an actual end-to-end response time distribution.

18. The computer-readable code of claim 17, wherein the method further comprises determining, by a computing device, an adjustment that can be made to the process to improve the actual end-to-end response time distribution.

* * * * *